March 18, 1958 — J. KESSEL ET AL — 2,827,323
KNOB COUPLINGS

Filed Jan. 18, 1956 — 2 Sheets-Sheet 1

INVENTORS: JOHN KESSEL
EDWARD L. KNAPP
BY: *ATTORNEY*

March 18, 1958 J. KESSEL ET AL 2,827,323
KNOB COUPLINGS
Filed Jan. 18, 1956 2 Sheets-Sheet 2
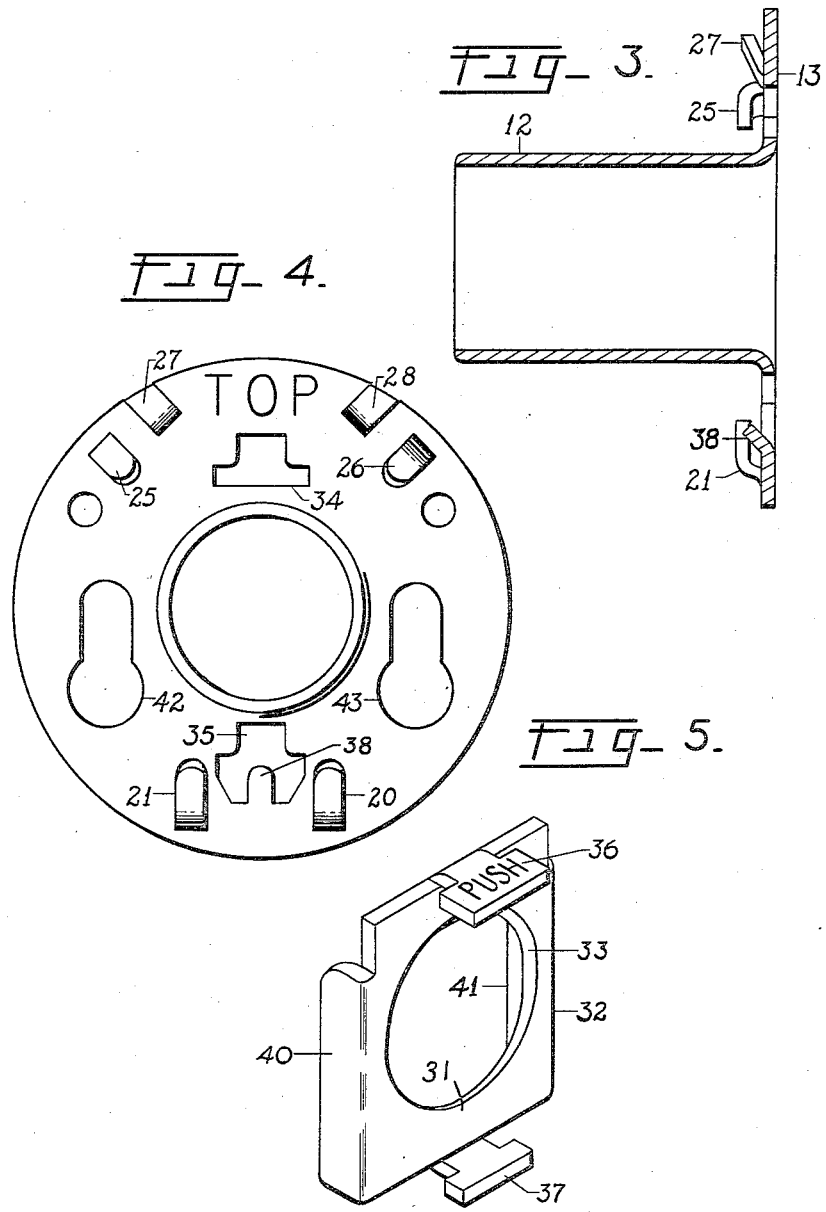
INVENTORS: JOHN KESSEL
EDWARD L. KNAPP
BY:
ATTORNEY

United States Patent Office 2,827,323
Patented Mar. 18, 1958

2,827,323

KNOB COUPLINGS

John Kessel and Edward Lewis Knapp, Grand Rapids, Mich., assignors to Dexter Industries, Inc., Grand Rapids, Mich., a corporation of Michigan Application January 18, 1956, Serial No. 559,934

7 Claims. (Cl. 292—352)

This invention has been developed primarily for incorporation in lock and latch mechanisms for doors; and relates particularly to a detachable method of coupling the knob to the portion of the mechanism which is normally semi-permanently mounted in the door structure. One of the principal factors determining the design of such devices is the assembly of the components on installation, and disassembly for adjustment and repair. The requirements of an artistic and relatively uninterrupted contour complicates the problem of fastening one element with respect to another, since it is undesirable to expose fastenings which would interfere with the appearance. Recognition must also be made of the fact that intricate procedures may not be required of the average workman intrusted with the installation and repair of these mechanisms, and the less of his time which will be needed to perform his work the better.

This invention has been developed primarily to provide a durable and effective system for detachably coupling a knob to a lock or latch mechanism with the maximum simplicity of the assembly operation. Several details of construction are also provided which facilitate the assembly of the several components responsible for releasably securing the knob, and the economy of manufacture resulting from these construction features permits the use of a very high quality system without undue increase in cost.

In general terms, a knob is provided with an extended hub which is rotatably received preferably within a tubular member having a radially-extending flange forming a base plate normally secured to the surface of the door. The hub of the knob extends through the plane of the flange, and a slideable locking member mounted for movement parallel to the plane of the base plate engages a preferably annular groove in the knob hub to prevent withdrawal thereof after the locking member has come into engagement. The locking member has a central hole normally substantially in alignment with the opening in the base plate, resulting in the surrounding of the hub by the locking member in the assembled condition.

The locking member is slideably received within suitably-formed apertures of the base plate which establish guideways to determine the range of sliding movement, and the locking member is biased by a spring to maintain the engaged position of the knob. The spring is preferably of the compression type, and acts between the locking member and a locating stud preferably integrally formed with the base plate in such a manner that the locking member can only be assembled into engagement with the guideway when the spring-locating stud is deformed from its finally-assembled position. The guideway openings in the base plate are formed to admit the sliding member at a particular position, and the deformation of the spring-locating stud after assembly causes the stud to act as a stop preventing the movement of the locking member into such a position which would permit withdrawal and disengagement of the locking member from the base plate.

Since the principal function of the stud is to determine the position of the spring, an alternative arrangement having the same performance characteristics is possible, and which includes the use of the "shut height" of the spring as a stop, rather than providing for the positive engagement of the sliding member with the stud itself. "Shut height" in the design of springs indicates the minimum axial length to which a spring may be compressed, and represents the condition in which each of the coils is in contact with the coils adjacent to it.

The several features of the invention will be discussed in detail through an analysis of the particular embodiments illustrated in the accompanying drawings. In the drawings:

Figure 1 presents an axial section through the knob coupling system provided by the invention.

Figure 2 presents a view of the base plate and locking member sub-assembly taken on a plane perpendicular to the axis of the mechanism, and viewed as looking toward the door.

Figure 3 is a sectional elevation taken along an axial plane showing the structural details of the base plate member itself.

Figure 4 is a view taken on a plane normal to the axis of the base plate shown in Figure 3.

Figure 5 is a perspective view showing the details of the sliding locking member.

Figure 1:
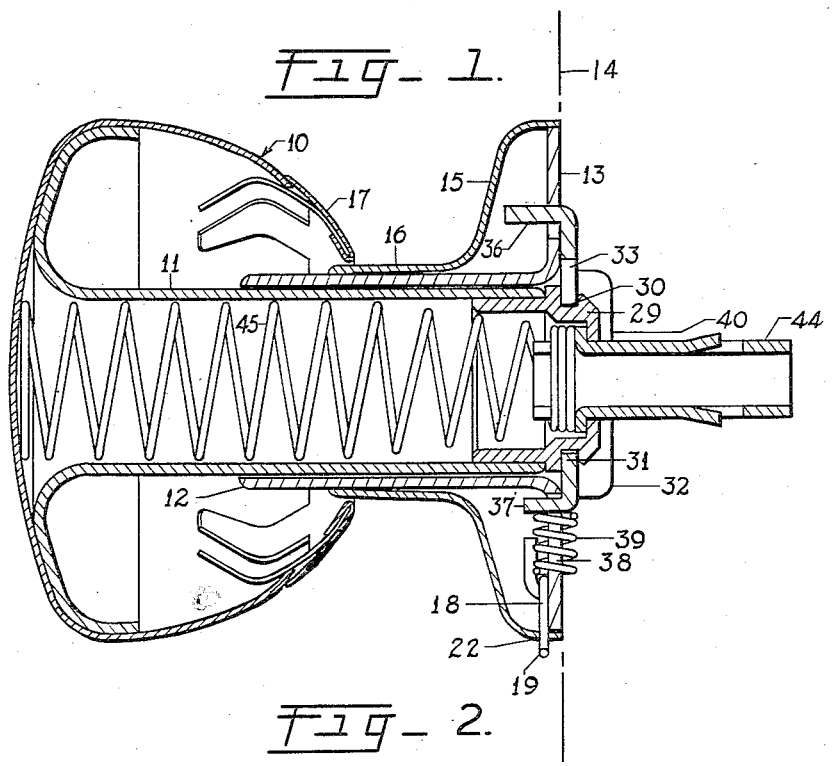

Referring to the drawings, a knob assembly 10 includes a tubular hub 11 rotatably received within a tubular portion 12 formed integrally with the base plate 13 secured to the surface 14 representing a door. The base plate 13 is formed as an annular flange extending radially from the tubular portion 12.

Figure 2:
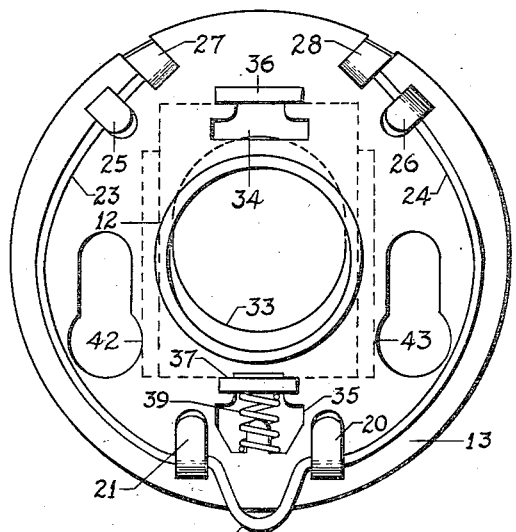

A covering member 15 is annular in form, and has a tubular section 16 slidably received on the outside diameter of the tubular portion 12 of the base plate, and moves within the clearance established between the shell 17 of the knob and the outside of the tubular portion 12. The covering member 15 is capable of moving axially to the left as shown in Figure 1 to expose the structure associated with the base plate and the coupling system described herein. A resilient wire member 18 having a detent portion 19 is capable of sufficient flexing within the confinement provided by the bent ears 20 and 21 (refer to Figure 2) to permit the detent 19 to move radially inward a sufficient amount to clear the inside of the cover 15, and then snap outward into engagement with a suitable opening 22 in the rim of the cover member to lock the same in position. The ends 23 and 24 of the resilient wire member 18 are confined underneath the tabs 25 and 26, and normally butt against stops formed by the tabs 27 and 28.

The inner end of the hub 11 of the knob assembly is provided with the plug 29 having the annular groove 30. The knob assembly is secured in the position shown in Figure 1 by the engagement of the portion 31 of the locking member 32 at the edge of the central opening 33.

The details of construction of the locking member are best shown in Figure 5. The upper extremities of the openings 34 and 35 in the base plate 13 are formed to serve as guideways receiving the T-shaped sections 36 and 37 of the sliding member 32, with the head of the T preventing axial withdrawal of the locking member 32 from the base plate. The lower extremities of the openings 34 and 35 are provided with a wider section of sufficient size to permit the insertion of the head of the T-shaped sections, and the locking member 32 is assembled into engagement with the guideway openings 34 and 35 when the spring-locating ear 38 is in the position shown in Figure 3. After the assembly of the slideable locking member 32 into the guideways, the spring 39 is fitted over the ear 38, and the ear is then bent into generally co-planar relationship with the base plate 13. The opposite end of the spring from that which receives the ear 38 bears directly against the T-shaped portion 37 of the locking member 32. The proportions of this arrangement can be selected so that the height of the ear 38 will cause the upper end of it to act as an abutment limiting the downward movement of the locking member 32 with respect to the assembly, or the spring 39 may be so designed that its shut height will serve the same purpose.

Preferably, the upper T-shaped member 36 is formed with a somewhat enlarged head, on which the word "push" is imprinted. The procedure for removing a knob includes the disengagement of the detent 19 from the aperture 22 of the cover member 15, followed by the axial sliding of the cover member to the left (as in Figure 1) a sufficient amount to expose the surface on which the word "push" has been imprinted. The application of a screw driver or any other convenient tool with downward force will serve to move the locking member 32 a sufficient amount to disengage the portion 31 from the annular groove 30, and thereby release the knob assembly so that it can be withdrawn. The range of movement provided by the guideway portions of the apertures 34 and 35 is of sufficient length to accommodate a disengagement of the groove 30 by the locking member 32 without involving a movement of the locking member into position where the T-shaped guideway-engaging portions 36 and 37 can be withdrawn axially from the base plate.

Preferably, the slideable locking member 32 is provided with stiffening flanges 40 and 41 (refer to Figure 5), and it should be noted that the door to which the mechanism is secured is normally provided with a cutout area of sufficient size to accommodate the movement of the locking member 32.

The base plate 13 (refer to Figure 2) is conventionally provided with the holes 42 and 43 to receive mounting screws, and a knob spindle 44 (which forms no part of this invention) extends co-axially from the hub of the knob assembly 10 for co-operation with the lock or latch mechanism contained within the door. The spring 45 is responsible for resiliently maintaining the position of the spindle 44, and has no connection with the present invention.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A disengageable coupling for a knob, said coupling comprising: a base plate provided with a central opening and a tubular projection extending therefrom and surrounding said central opening, and having spaced apertures therein establishing guide means, said base plate having a deformable ear projecting into one of said apertures; a slideable member mounted for movement transverse to the axis of said projection, said slideable member having an opening therein and having T-shaped guide-engaging means cooperating with said apertures, said apertures being shaped to admit said guide-engaging means in one position and confine said guide-engaging means against withdrawal from said base plate within a limited range of sliding movement transverse with respect to the axis of said projection, said openings in said base plate and slideable member having relative alignment within said range of sliding movement; biasing means urging said sliding member along said range of movement, and including a compression spring having one end thereof in engagement with said ear and the opposite end in engagement with one of said guide-engaging means, said ear being deformable from a position admitting said guide-engaging means into said guide means to a position preventing movement of said slideable member beyond an extremity of said limited range; and a knob having a hub rotatably mounted in said tubular projection, and having an annular groove engageable with said sliding member, said hub normally traversing said base plate and sliding member apertures.

2. A disengageable coupling for a knob, said coupling comprising: a base plate provided with a central opening and a tubular projection extending therefrom and surrounding said central opening, and having spaced apertures therein establishing guide means, said base plate having a deformable ear projecting into one of said apertures; a slideable member mounted for movement transverse to the axis of said projection, said slideable member having an opening therein and having T-shaped guide-engaging means cooperating with said apertures, said apertures being shaped to admit said guide-engaging means in one position and confine said guide-engaging means against withdrawal from said base plate within a limited range of sliding movement transverse with respect to the axis of said projection, said openings in said base plate and slideable member having relative alignment within said range of sliding movement; biasing means urging said sliding member along said range of movement, and including a compression spring having one end thereof in engagement with said ear and the opposite end in engagement with one of said guide-engaging means, said ear being deformable from a position admitting said guide-engaging means into said guide means to a position preventing movement of said slideable member beyond an extremity of said limited range; and a knob having a hub rotatably mounted in said tubular projection, and having an annular groove engageable with said sliding member, said hub normally traversing said base plate and sliding member apertures.

3. A disengageable coupling for a knob, said coupling comprising: a base plate provided with a central opening and a tubular projection extending therefrom and surrounding said central opening, and having spaced apertures therein establishing guide means, said base plate having a deformable ear projecting into one of said apertures; a slideable member mounted for movement transverse to the axis of projection, said slideable member having an opening therein and having T-shaped guide-engaging means cooperating with said apertures, said apertures being shaped to admit said guide-engaging means in one position and confine said guide-engaging means against withdrawal from said base plate within a limited range of sliding movement transverse with respect to the axis of said projection, said openings in said base plate and slideable member having relative alignment within said range of sliding movement; biasing means urging said sliding member along said range of movement, and including a compression spring having one end thereof in engagement with said ear and the opposite end in engagement with said sliding member; said ear being deformable from a position admitting said guide-engaging means into said guide means to a position preventing movement of said slideable member beyond an extremity of said limited range; and a knob having a hub rotatably mounted in said tubular projection, and having an annular groove engageable with said sliding member, said hub normally traversing said base plate and sliding member apertures.

4. A disengageable coupling for a knob, said coupling comprising: a base plate provided with a central opening and a tubular projection extending therefrom and surrounding said central opening, and having at least one aperture therein establishing guide means, said base plate having a deformable ear projecting into said aperture, a slideable member mounted for movement transverse the axis of said projection, said slideable member having an opening therein and having guide-engaging means cooperating with said aperture, said aperture being shaped to admit said guide-engaging means in one position and confine guide-engaging means against withdrawal from said base plate within a limited range of sliding movement transverse with respect to the axis of said projection, said openings in said base plate and slideable member having relative alignment within said range of sliding movement; biasing means urging said sliding member along said range of movement, and including a compression spring having one end thereof in engagement with said ear and the opposite end in engagement with said sliding member, said ear being deformable from a position admitting said guide-engaging means into said guide means to a position preventing movement of said slideable member beyond an extremity of said limited range; and a knob having a hub rotatably mounted in said tubular projection, and having an annular groove engageable with said sliding member, said hub normally traversing said base plate and sliding member apertures.

5. A disengageable coupling for a knob, said coupling comprising: a base plate provided with a central opening and a projection extending therefrom, and having at least one aperture therein establishing guide means, said base plate having a deformable ear projecting into said aperture; a slideable member mounted for movement transverse to the axis of said projection, said slideable member having an opening therein and having guide-engaging means cooperating with said aperture, said aperture being shaped to admit said guide-engaging means in one position and confine said guide-engaging means against withdrawal from said base plate within a limited range of sliding movement transverse with respect to the axis of said projection, said openings in said base plate and slideable member having relative alignment within said range of sliding movement; biasing means urging said sliding member along said range of movement, and including a compression spring having one end thereof in engagement with said ear and the opposite end in engagement with said sliding member, said ear being deformable from a position admitting said guide-engaging means into said guide means to a position preventing movement of said slideable member beyond an extremity of said limited range; and a knob having a hub rotatably mounted in said projection, and having a groove engageable with said sliding member, said hub normally traversing said base plate and sliding member apertures.

6. A disengageable coupling for a knob, said coupling comprising: a base plate provided with a central opening and a tubular projection extending therefrom and surrounding said central opening, and having at least one aperture therein establishing guide means; a slideable member mounted for movement transverse to the axis of said projection, said slideable member having an opening therein and having guide-engaging means cooperating with said aperture, said aperture being shaped to admit said guide-engaging means in one position and confine said guide-engaging means against withdrawal from said base plate within a limited range of sliding movement transverse with respect to the axis of said projection, said openings in said base plate and slideable member having relative alignment within said range of sliding movement; biasing means urging said sliding member along said range of movement; and a knob having a hub rotatably mounted in said tubular projection, and having an annular groove engageable with said sliding member, said hub normally traversing said base plate and sliding member apertures.

7. A disengageable coupling for a knob, said coupling comprising: a base plate provided with a central opening and a projection extending therefrom, and having at least one aperture therein establishing guide means; a slideable member mounted for movement transverse to the axis of said projection, said slideable member having an opening therein and having guide-engaging means cooperating with said aperture, said aperture being shaped to admit said guide-engaging means in one position and confine said guide-engaging means against withdrawal from said base plate within a limited range of sliding movement transverse with respect to the axis of said projection, said openings in said base plate and slideable member having relative alignment within said range of sliding movement; biasing means urging said sliding member along said range of movement; and a knob having a hub rotatably mounted in said projection, and having a groove engageable with said sliding member, said hub normally traversing said base plate and sliding member apertures.

References Cited in the file of this patent
UNITED STATES PATENTS

| 339,440 | Libby | Apr. 6, 1886 |

FOREIGN PATENTS

| 15,022 | Great Britain | Oct. 19, 1888 |